United States Patent
Nevers et al.

(10) Patent No.: US 9,181,987 B2
(45) Date of Patent: Nov. 10, 2015

(54) DEVICE FOR END-TO-END COUPLING OF A SUPERCRITICAL TRANSMISSION SHAFT, IN PARTICULAR FOR DRIVING A ROTORCRAFT ROTOR

(71) Applicant: EUROCOPTER, Marignane (FR)

(72) Inventors: Romain Nevers, Pelissanne (FR); Leo Trierweiler, Aix En Provence (FR); Francois Malburet, Coudoux (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 13/911,497

(22) Filed: Jun. 6, 2013

(65) Prior Publication Data

US 2014/0004964 A1     Jan. 2, 2014

(30) Foreign Application Priority Data

Jun. 28, 2012 (FR) ..................... 12 01830

(51) Int. Cl.
   *F16C 23/04*     (2006.01)
   *F16D 3/24*     (2006.01)
   *F16C 23/08*     (2006.01)
   *F16D 3/00*     (2006.01)

(52) U.S. Cl.
   CPC ............. *F16D 3/24* (2013.01); *F16C 23/084* (2013.01); *F16D 3/005* (2013.01); *F16D 2300/22* (2013.01); *Y10T 464/50* (2015.01)

(58) Field of Classification Search
USPC ............. 464/178, 180; 384/498, 535, 581; 244/60; 188/106 R
See application file for complete search history.

(56) References Cited

U.S. PATENT DOCUMENTS

| | | | |
|---|---|---|---|
| 3,425,239 | A | 2/1969 | Baier |
| 6,168,530 | B1 | 1/2001 | Guimbal |
| 6,491,497 | B1 | 12/2002 | Allmon |
| 6,550,974 | B2 * | 4/2003 | Zoppitelli et al. ............ 384/498 |
| 7,109,619 | B2 | 9/2006 | Brunken |
| 2004/0218843 | A1 * | 11/2004 | Jennes et al. .................. 384/498 |
| 2013/0089284 | A1 | 4/2013 | Cazaux |

FOREIGN PATENT DOCUMENTS

| | | |
|---|---|---|
| EP | 0722544 B1 | 7/1997 |
| EP | 1191191 A2 | 3/2002 |
| EP | 2367268 A1 | 9/2011 |
| FR | 2742727 A1 | 6/1997 |
| FR | 2962176 A1 | 1/2012 |

OTHER PUBLICATIONS

Search Report and Written Opinion; Application No. FR1201830; dated Jan. 17, 2013.

* cited by examiner

*Primary Examiner* — Gregory Binda
(74) *Attorney, Agent, or Firm* — Brooks Kushman P.C.

(57) ABSTRACT

A coupling device (9, 10) providing end-to-end coupling between link shafts (4) and a supercritical transmission shaft (5) for driving a rotorcraft rotor (1). Since the transmission shaft (5) is movable in angular deflection (B), spherical bearing surface friction members (12, 13) are incorporated in the bearings (7) for mounting the transmission shaft (5) on a carrier structure (8). The friction members (12, 13) are caused to press against each other in dry friction via respective friction surfaces. A first friction member (12) is secured to the carrier structure (8) and a second friction member (13) is secured to a cage (14) for housing rolling members (15) carried by the transmission shaft (5). The cage is itself engaged on the transmission shaft (5) to accompany it in its movement in angular deflection (B).

14 Claims, 2 Drawing Sheets

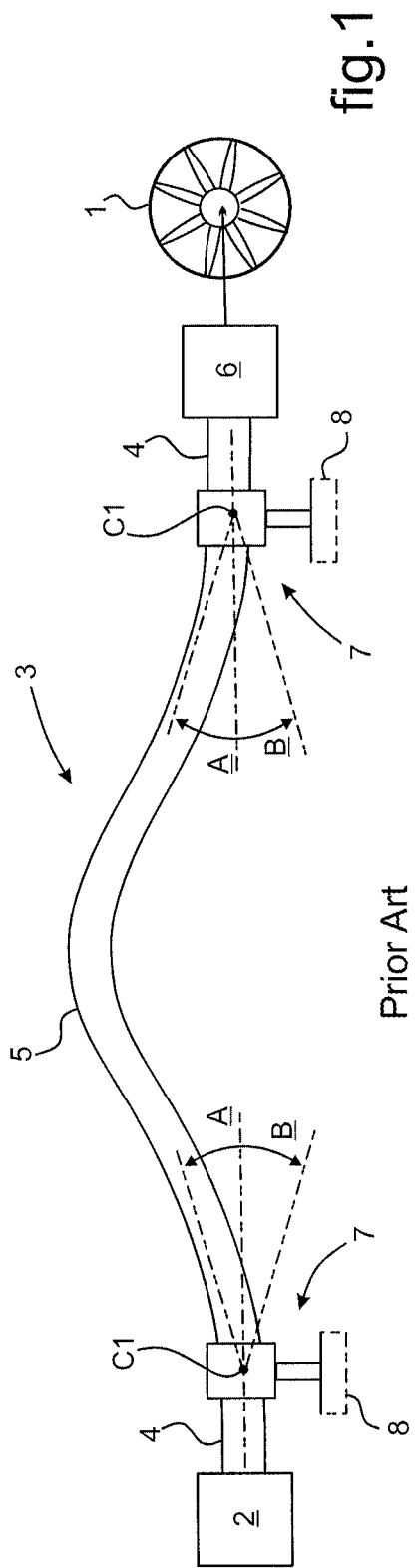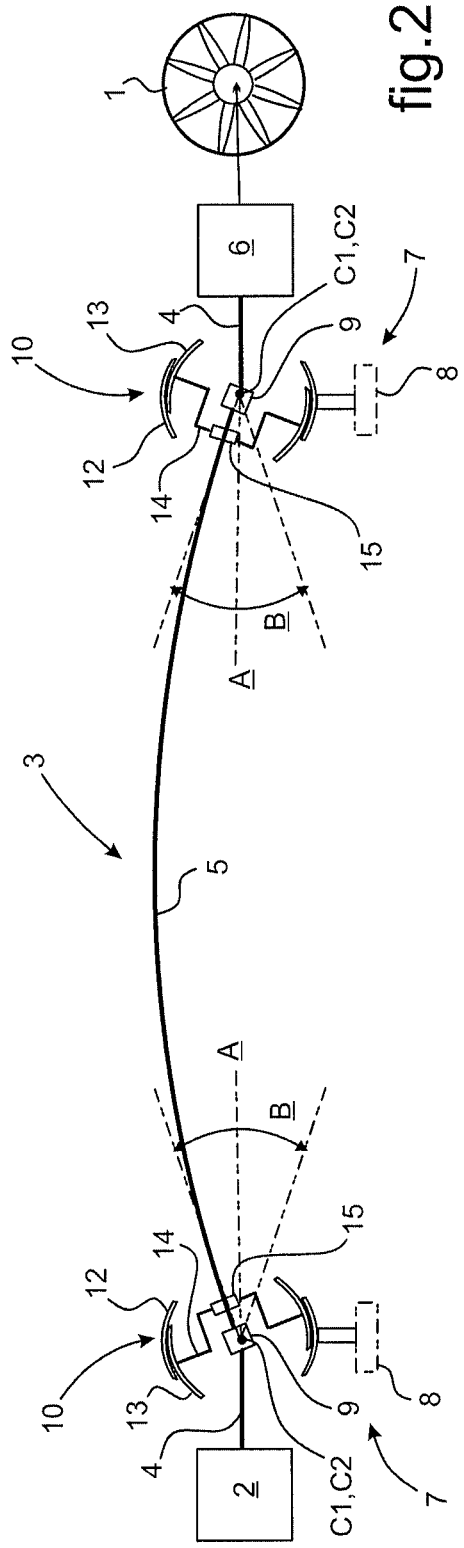

DEVICE FOR END-TO-END COUPLING OF A SUPERCRITICAL TRANSMISSION SHAFT, IN PARTICULAR FOR DRIVING A ROTORCRAFT ROTOR

CROSS REFERENCE TO RELATED APPLICATIONS

This application claims priority to French patent application No. FR 12 01830 filed on Jun. 28, 2012, the disclosure of which is incorporated in its entirety by reference herein.

BACKGROUND OF THE INVENTION (1) Field of the Invention

The present invention relates to the field of devices for end-to-end coupling between two rotary shafts, and it relates more particularly to such coupling devices provided with arrangements for reducing unbalance in a supercritical shaft that is driven in rotation.

The present invention provides such a coupling device, in particular in the context of end-to-end coupling between at least two rotary shafts for driving a rotorcraft rotor that is at a considerable distance from a drive source, and more specifically for driving a rotorcraft tail rotor.

(2) Description of Related Art

In the field of rotorcraft, at least one power plant serves to provide rotary drive for at least one rotor of the rotorcraft. The rotorcraft has a main rotor with a substantially vertical axis that provides it at least with lift, and usually also with propulsion, and indeed with guidance in flight. A rotorcraft frequently has at least one auxiliary rotor with an axis that is substantially horizontal, commonly a tail rotor or less frequently a propulsive propeller for a fast rotorcraft having long range.

Rotorcraft are frequently fitted with a main gearbox engaged with the power plant of the rotorcraft. Various rotors of the rotorcraft are driven in rotation from the main gearbox via transmission shafts. It is common for such transmission shafts to be very long axially, in order to rotate a rotor that is at a considerable distance from the main gearbox, such as a tail rotor.

This leads to the general problem of driving rotation of such remote rotors from the power plant by means of such a long transmission shaft. For example, for a tail rotor, the transmission shaft extends along a tail boom of the rotorcraft in order to drive the tail rotor from the main gearbox. The length over which the transmission shaft extends is potentially of the order of several meters.

The transmission shaft is commonly mounted on a carrier structure of the rotorcraft, and it is coupled to link shafts at its respective ends. An inlet link shaft engages with the drive source in order to drive rotation of the transmission shaft. An outlet link shaft driven by the transmission shaft is engaged with the remote rotor in order to drive it in rotation, in particular via a secondary gearbox.

Nevertheless, the environment of the transmission shaft is subjected to vibration under the effect of aerodynamic stresses to which the structure of the rotorcraft is subjected in flight. Such flight conditions make it difficult to support the transmission shaft all along its length by the carrier structure of the rotorcraft, in particular in a rotorcraft tail in the situation when the remote rotor that is to be driven is a tail rotor. In addition, the weight of the transmission shaft is not uniform along its entire length, thereby leading in particular to localized unbalance. Furthermore, at a threshold speed of rotation, the transmission shaft may potentially be set into resonance at a proper resonant frequency, thereby leading to structural vibrations of the transmission shaft.

In this context, it is conventional to distribute balancing rings along the transmission shaft and also support bearings and/or elastically deformable members for damping vibration.

It is desired to facilitate balanced rotation of the transmission shaft over its entire length and to protect it as well as possible from the various kinds of vibration to which it is subjected. Nevertheless, such solutions involve the use of a large number of parts for mounting the transmission shaft on the rotorcraft. This leads to considerable manufacturing and maintenance costs for the rotorcraft, and it is desirable to reduce such costs. In addition, such a large number of parts increases the weight of the rotorcraft, which is always to be avoided in the field of aviation.

An advantageous solution consists in using a supercritical flexible shaft to form the transmission shaft. Using a supercritical transmission shaft makes it possible in particular to avoid mounting the transmission shaft to the structure of the rotorcraft via the various bearings and damper members that are conventionally distributed along the length of the transmission shaft.

Nevertheless, the use of a supercritical transmission shaft involves accommodating its deformation between nodes that are in alignment on the axis along which it naturally extends when at rest, and more particularly to accommodate its deformation in angular deflection between its ends that are engaged with the link shafts.

There then arise difficulties in achieving end-to-end coupling between the supercritical transmission shaft and the link shafts. Such coupling needs to procure well-balanced rotation of the transmission shaft. Optimized transmission of torque between the transmission shaft and the link shafts needs to be encouraged. Account must also be taken not only of the angular deflection of the supercritical transmission shaft relative to the axes of the link shaft, but also of potential angular misalignment, radial misalignment, and/or axial offset between the shafts.

In order to procure good torque transmission, the means for transmitting torque between the transmission shaft and the link shafts are conventionally robust. Such robust torque transmission means are commonly of the type making use of fluting, notched or toothed members, or other analogous means for robust radial engagement.

In the context of a supercritical transmission shaft, flexible junction means are provided between the supercritical junction shaft and the link shafts. Such a flexible junction makes it possible, in spite of the supercritical transmission shaft deforming between its ends, to avoid seizing or even jamming in operation of the robust torque transmission means that are conventionally used. For example, a flexible end-to-end coupling member is interposed between the transmission shaft and a link shaft. Such a flexible member accommodates movement in angular deflection of the transmission shaft relative to the link shafts. By way of example, such a flexible coupling member is arranged as a plate made up of juxtaposed strips, said plate being placed in radially opposite engagement respectively with the transmission shaft and with a link shaft.

The present invention takes into consideration more specifically the management of angular deflections of the transmission shaft relative to the axes along which the link shafts extend. A flexible connection between the transmission shaft and the link shafts makes such angular deflection possible, but it is nevertheless desirable for it to be damped. A supercritical transmission shaft is commonly supported at its end by respective rolling bearings carried by a carrier structure, and means for accommodating and damping movement in angular deflection of the supercritical transmission shaft are interposed between the carrier structure and the transmission shaft.

In general, the solutions used in the field of supercritical transmission shafts make use of means for damping the bending deflection of the transmission shaft. By way of example, such damping means make use of hinged structures distributed along the transmission shaft and capable of damping the bending deflection of the transmission shaft relative to the axes of rotation of the link shafts. Although such hinged structures present the advantage of being inexpensive and light in weight, they nevertheless present the drawbacks of being subjected to rapid aging and of it being necessary to install a plurality of them along the transmission shaft, thereby leading to unwanted extra weight in the rotorcraft.

Consequently, it is necessary to provide arrangements for installing and operating said damper means that tend to provide long-lasting reliability and accurate damping of the deformation of the supercritical transmission shaft, while avoiding making the rotorcraft heavier.

More particularly, it should be considered that the arrangements for mounting and damping deformation of a supercritical transmission shaft, and in particular such deformation in angular deflection, tend to make the overall structure of the end-to-end coupling device between the transmission shaft and the link shafts more complex and excessively heavy. Such complex and heavy structures should be avoided, in particular in the field of aviation, and they are not simple to maintain.

It is also necessary to take care that the provisions for mounting and damping angular deflections of the supercritical transmission shaft do not shorten the lifetime of structural members of the coupling device, while avoiding making that structure excessively complex. The arrangements of mounting and damping angular deflections of the supercritical transmission shaft must have no effect on the structure or on the specific operation of the members used together for coupling the transmission shaft with the link shafts, for damping the angular deflections of the transmission shaft, or indeed for guiding and procuring balanced rotation of the transmission shaft relative to the carrier structure.

For further knowledge of a technological environment close to that of the present invention, reference may be made to the following documents: U.S. Pat. No. 3,425,239 (Boeing Co.); FR 2 962 176 (Turbomeca); EP 0 722 544 (Minnesota Mining & Mfg); and EP 2 367 268 (Bell Helicopter Textron Inc.).

BRIEF SUMMARY OF THE INVENTION

The object of the present invention is to provide a device for flexible end-to-end coupling between a supercritical transmission shaft and link shafts between which the transmission shaft is interposed. Such a coupling device of the present invention comprises in particular means for providing coupling in angular deflection between the transmission shaft and the link shafts, and means for damping deformation of the transmission shaft while in rotation, and in particular deformation in angular deflection.

The present invention seeks more particularly to provide such a coupling device that provides angular deflection damping between said shafts in the context of the above-specified constraints and difficulties that need to be overcome, in particular in the context of driving a rotorcraft rotor that is remote from a drive source, and more particularly a tail rotor or a propulsive propeller.

The coupling device of the present invention is a device for end-to-end coupling between a supercritical transmission shaft and link shafts between which the transmission shaft is interposed.

The coupling device of the present invention is structured in particular for fitting to a rotorcraft. In this context, the transmission shaft has its ends connected respectively to an inlet link shaft engaged with a drive source of the rotorcraft, and with an outlet link shaft engaged with a rotor of the rotorcraft. By way of example, said rotor could equally well be a tail rotor or a propulsive propeller.

The coupling device of the present invention comprises coupling means for flexible end-to-end coupling between the ends of the transmission shaft and respectively with one and the other of the link shafts. The coupling means procure freedom to move in angular deflection about centers of motion for the transmission shaft relative to the axes of rotation of the link shaft.

The coupling device of the present invention further comprises damper means for damping the movement in angular deflection of the transmission shaft relative to the axes of the link shafts.

The coupling device of the present invention also includes at least one bearing, comprising a cage housing at least one rolling member. Said bearing in particular forms a bearing for mounting one of the ends of the transmission shaft on a carrier structure. Said at least one rolling member is interposed between the transmission shaft and the carrier structure.

According to the present invention, such a coupling device is mainly recognizable in that the damper means comprise at least one pair of friction members having spherical bearing surfaces that are incorporated in a said bearing and placed to press one towards the other via respective friction surfaces, operating in dry friction in particular. A first friction member is securely engaged with the carrier structure and a second friction member is securely engaged with said cage. Said cage is itself engaged on the transmission shaft to accompany it in its movement in angular deflection.

The angular deflection movements of the transmission shaft while it is being driven in rotation are damped by the friction between the friction members bearing one against the other. The bearing engagement between the friction members may be the result of friction surfaces of the friction members bearing directly one on the other, or it may be the result of indirect bearing via a friction material interposed between the friction surfaces of the friction members, as described below.

The damper means are incorporated in particular in each of the bearings supporting the respective ends of the transmission shaft. Such end bearings are advantageously used for end-to-end coupling of the transmission shaft with the link shafts. The friction members may be simple in structure, robust, and light in weight, and incorporating them in the bearings does not lead to excessive complexity or considerable extra weight for the structure of the bearing.

The friction damping procured by the friction members bearing one against the other, whether directly or indirectly, is free from any random result or rapid aging that would be induced by using elastic deformation means, unless the structure of the damper device were to be made more complex in order to mitigate such random results and such rapid aging.

The ability of the cage to move in angular deflection to accompany the angular deflection movement of the transmission shaft protects the rolling member(s) housed therein from any stresses that might affect the operation of the rolling members and harm the rotary guidance of the transmission shaft on the carrier structure.

The ability of the friction members to move relative to each other is restricted to the relative angular deflection movements between the casing housing the rolling members and the carrier structure. The effectiveness of the damping obtained by friction is reinforced, and the means for rotatably mounting the transmission shaft on the bearings are preserved. The stresses to which the friction members are subjected are restricted to their dedicated function of damping the angular deflection of the transmission shaft.

It should be considered that the structural simplicity of the damper device makes it easier to incorporate such damper means and coupling means in a said bearing, by defining a common center for relative movement both between the link shafts and the transmission shaft and between the friction members, with this continuing to apply in an advantageous context that the invention makes possible, whereby the structural members respectively forming the coupling means and the damper means are structurally separate.

More particularly, and in an advantageous embodiment, for a given bearing of the damper device, the geometrical center defining said spherical friction surfaces coincides with a said center of motion.

Such provisions are arranged in particular for each of the bearings used for mounting each of the ends of the transmission shaft on the carrier structure. A close geometrical relationship is established between a said center of motion in angular deflection of the transmission shaft and a said geometrical center from which the friction surfaces are defined, which surfaces act directly to damp the angular deflections of the transmission shaft, with this applying likewise in the advantageous context of structural separation between the end-to-end coupling means and the damper means.

More particularly, the coupling means and the damper means are advantageously separate, comprising respective sets of members. The members individually making up said sets are preferably members that are distinct in each of the sets. Such structural separation between the coupling means and the damper means serve to simplify and lighten the structure(s) of the bearing(s) for mounting the ends of the transmission shaft on the carrier structure. Such provisions serve in particular to preserve either of these structures from the stresses to which the other structure is subjected.

Preferably, the cage is secured to move in angular deflection with the transmission shaft via junction means including at least one said rolling member.

The rolling bearing is mounted to move in angular deflection both with the cage and with the transmission shaft. Such mounting for the rolling bearing is achieved in particular by means of the rings commonly to be found therein that house between them rolling elements, such as balls or analogous rolling elements.

More particularly, a said outer ring of the rolling member is secured to the cage and a said inner ring of the rolling member is secured to the transmission shaft. The rolling elements interposed between said rings are protected from any stresses induced by the angular deflection of the transmission shaft so as to avoid affecting their operation or their lifetime. The rolling member is advantageously used for ensuring that the cage and the transmission shaft move together in angular deflection without affecting the operation of the rolling member with respect to the rolling allowed for ensuring free rotation between the cage and the transmission shaft.

In a preferred embodiment, said friction members are fitted with clamping means pressing one against the other. Such clamping means are potentially simple in structure, and they are advantageously of a conventional type providing an adjustable clamping force, thereby enabling the clamping of the friction members one against the other to be adjustable.

By way of example, such clamping means may be of the type using bolts, clamps, or analogous techniques for applying thrust against both of the friction members so as to press their friction surfaces towards each other. Such clamping means make it easy to adjust accurately the thrust forces that urge the friction surfaces towards each other, either one directly against the other, or else indirectly via a friction material interposed between them.

Potentially the clamping means comprise elastically deformable means for compressing the friction members towards each other. The clamping means put said elastically deformable means under permanent stress at a predetermined stress threshold. Such elastically deformable means associated with the clamping means make it easy to adjust the force with which the friction surfaces are pressed against each other by adjusting the stress to which such elastically deformable means are subjected so that it is equal to said predetermined stress threshold.

Said elastically deformable means may be no more than a member interposed between the friction members and put under stress by the clamping means, or they may be no more than a member interposed between two friction elements, such as shells, making up either one of the friction members, with the other friction member being interposed between them.

In an embodiment, the cage includes a cylinder for receiving the rolling member. Said cylinder is extended axially by a chamber housing the coupling means. The wall defining said chamber is made up of two wall elements providing respectively the first friction member and the second friction member.

In another embodiment, the cage is provided with a collar shaped as a portion of a spherical cap. Said collar forms the second friction member and is clamped between two shells of the bearing that together form the first friction member.

Together the opposite faces of the collar constitute the friction surface of the second friction member. The facing faces of the shells act together to provide the friction surface of the first friction member, being placed to press respectively against opposite faces of the collar. Such simplicity of structure makes it easy to arrange clamping means that are advantageously fitted with said elastically deformable means.

For example, the clamping means bear axially in opposite directions respectively against the two shells. The elastically deformable means need be no more than a flexible plate of greater or lesser thickness that is easily interposed between the shells. Also by way of example, the elastically deformable means may be formed by an elastically compressible member that is interposed between one of the shells and clamping means arranged in axial engagement against both of the shells.

The friction surfaces may include surface treatment in order to impart their coefficient of friction thereto. By way of example, such surface treatment is obtained by working the surface so as to obtain a specific degree of roughness for the friction surface. Such surface treatment may potentially provide localized portions in relief such as microindentations or stripes, and it may be performed for example by removing material by means of a mechanical, thermal, or chemical method. Also by way of example, said surface treatment may be performed by adding material, in particular a surface coating.

In a particular embodiment, a friction material is interposed between the friction surfaces pressing one against the other. Such a friction material is suitable for enhancing damping by friction against angular deflections of the transmission shaft, independently of the material selected overall to form the friction members.

By way of example, said friction material may be in powder form, being housed in a gap left between the friction surfaces, or indeed it may be housed inside said portions in relief formed on the friction surfaces. Also by way of example, a said friction material is potentially embedded in a bonding material. Also by way of example, such a friction material may be in the form of a surface coating provided on at least one of the friction surfaces.

In a preferred embodiment, and for a given bearing, the coupling means are of the type comprising a flexible member interposed between a link shaft and a corresponding end of the transmission shaft. Said flexible member is in radially opposite engagement respectively with the transmission shaft and with the link shaft. In a known embodiment, such a flexible member is arranged as a plate made up of juxtaposed strips.

BRIEF DESCRIPTION OF THE SEVERAL VIEWS OF THE DRAWINGS

Embodiments of the present invention are described with reference to the figures of the accompanying sheets, in which:

FIG. 1 is a diagrammatic view of a prior art transmission for driving a rotorcraft rotor;

FIG. 2 is a diagrammatic view of a transmission for driving a rotorcraft rotor in accordance with the present invention.

DETAILED DESCRIPTION OF THE INVENTION

Figure 3:
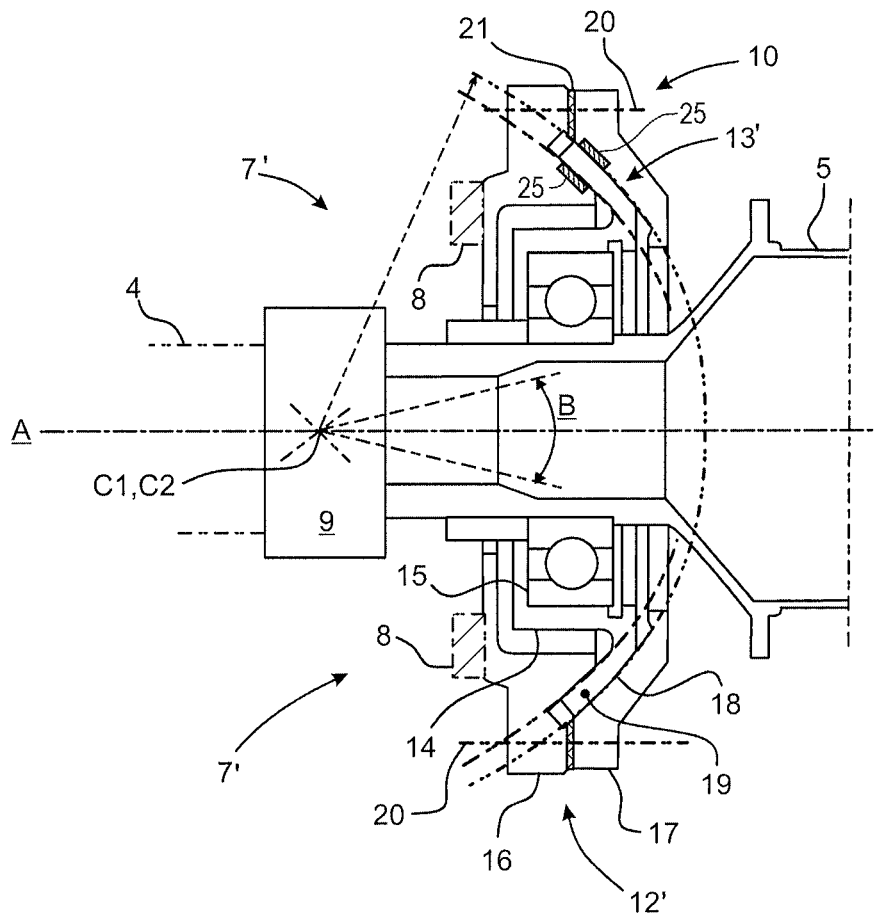
FIG. 3 is a view of a device for end-to-end coupling of a supercritical shaft with a link shaft in an embodiment of the present invention.

In FIGS. 1 and 2, a rotorcraft rotor 1 is driven in rotation from a first drive source 2. Said drive source 2 is constituted in particular by a main gearbox driven by a power plant of the rotorcraft. A powertrain 3 is interposed between the rotor 1 and the drive source 2. Said powertrain 3 comprises link shafts 4 with a supercritical transmission shaft 5 interposed between them.

More particularly, an inlet link shaft 4 engages the drive source 2 and an outlet link shaft 4 engages the rotor 1, in particular via an auxiliary gearbox 6. By way of example, the rotor 1 is more specifically a tail rotor of the rotorcraft carried at the end of a tail boom of the rotorcraft, and the auxiliary gearbox 6 is a tail gearbox.

The transmission shaft 5 has its end coupled end-to-end with the link shafts 4. The transmission shaft is mounted at each of its ends on a carrier structure 8 of the rotorcraft via bearings 7. Since the transmission shaft 5 is a supercritical flexible shaft, its coupling to the link shafts 4 requires account to be taken of the way it deforms between its ends. More particularly, account needs to be taken of deformation of the transmission shaft 5 in angular deflection B relative to the axes of rotation A of the link shafts 4.

Figure 4:
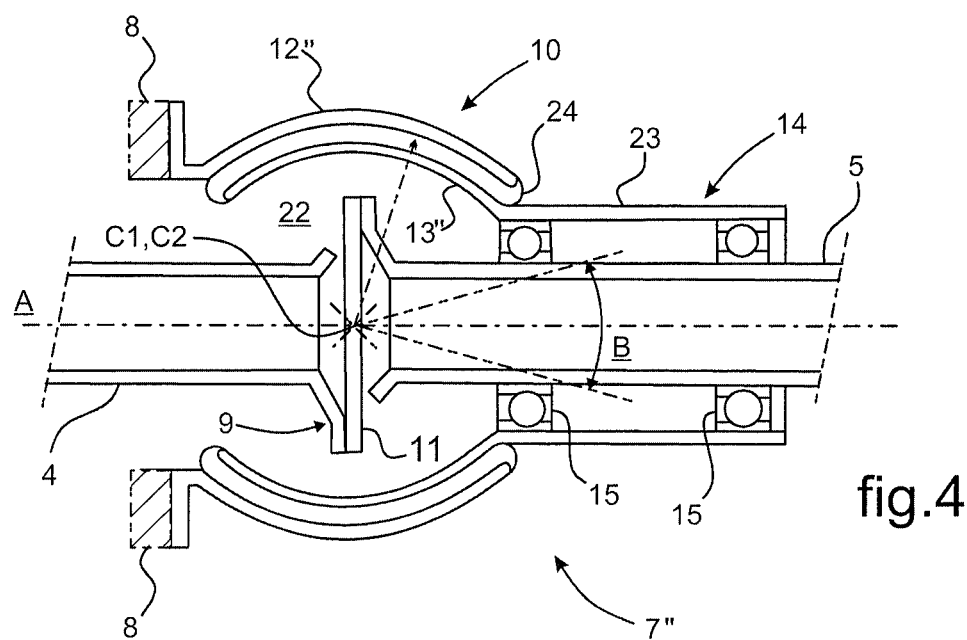
FIG. 4 is a view of a device for end-to-end coupling of a supercritical shaft with a link shaft in another embodiment of the present invention.

In accordance with the present invention as shown in FIGS. 2 to 4, the transmission shaft 5 is coupled to at least one of the link shafts 4 by means of an end-to-end coupling device 9, 10 forming part of the bearing. It should be understood that the transmission shaft 5 is preferably coupled at each of its ends to a respective link shaft 4 via a said coupling device. Nevertheless, it should be understood that either one of the ends of the transmission shaft 5 could potentially be provided with a said coupling device 9, 10 of the present invention, without requiring the angular deflection of the other end of the transmission shaft 5 to be accommodated by the associated bearing in the same way.

Each of the coupling devices 9 and 10 associates flexible end-to-end coupling means 9 between one end of the transmission shaft 5 with a link shaft 4 associated with that end, together with damper means 10 for damping the angular deflection movements of the transmission shaft 5.

For each of the bearings 7, the coupling means 9 allow the transmission shaft 5 to move with said angular deflection B about a center of motion C1. FIG. 2 shows the amount of deflection that can be accommodated by the coupling devices in terms of arcuate deformation of the transmission shaft 5 between its ends engaged respectively on the link shafts 4.

The coupling means 9 are of the type making use of a flexible member interposed end-to-end between a link shaft 4 and the transmission shaft 5. In the embodiment shown in FIG. 4, such a flexible member 11 is advantageously selected to be the type arranged as a plate made up of juxtaposed strips, said plate 11 being in radially opposite engagement respectively with the transmission shaft 5 and with the link shaft 4.

The damper means 10 are of the friction type, and they comprise two friction members 12 and 13 having spherical bearing surfaces engaged respectively on the carrier structure 8 and on one end of the transmission shaft 5. A first friction member 12 is securely engaged with the carrier structure 8 on which it is held stationary. A second friction member 13 is secured to the transmission shaft 5 and constrained to move with its motion in angular deflection B.

The coupling devices are advantageously of simple structure. For each of the bearings 7, said center of motion C1 coincides with the geometrical center C2 defining the friction surfaces of the friction members 12 and 13. Furthermore, the structure of the coupling means 9 and the structure of the damping means 10 are separate. The separation at each of the bearings 7 between the respective structures of the coupling means 9 and of the damper means 10 lies advantageously in making use of distinct members for said structures.

More particularly, for each of the bearings 7, the coupling means 9 are axially interposed at the ends of the link shaft 4 and of the transmission shaft 5. As mentioned above, the first friction member 12 is securely mounted on the carrier structure 8. The second friction member 13 is arranged on a cage 14 or on an analogous member for housing at least one rolling member 15. The rolling member(s) 15 is/are interposed between the transmission shaft 5 and the second friction member 13.

The cage 14, and thus also the second friction member 13, are engaged on the transmission shaft 5 via rolling members 15. The rolling members 15 are used to form means for joining the cage 14 and the transmission shaft 5 together, while allowing relative movement only in rotation between the transmission shaft 5 and the cage 14, and providing the connection with angular deflection B between the cage 14 and the transmission shaft 5. It should be observed that these arrangements make it possible not only to simplify the structure of the damper means 10, but also to protect the rolling members 15 from excessive radial stresses between the cage 14 and the transmission shaft 5.

For example, in FIG. 3 and for a given bearing 7, the first friction member 12 is made up of friction elements constituted respectively by two shells 16 and 17 that are fastened to each other and mounted on the carrier structure 8. Between them, the shells 16 and 17 form a housing 18 for receiving the second friction member 13. The second friction member 13 is interposed between the shells 16 and 17, e.g. being formed by a collar 19 arranged as a spherical cap and radially extending the cage 14. The friction surfaces between the first friction member 12 and the second friction member 13 include surface treatment 25 in order to impart their coefficient of friction thereto. The shells 16 and 17 are fastened in particular to each other by clamping means 20, such as for example: bolts, clamps, or other analogous clamping means.

The clamping means 20 serve to adjust the friction force exerted between the first friction member 12' and the second friction member 13'. The shells 16 and 17 are urged towards each other in a direction that is generally coaxial with the link shaft 4. The clamping means 20 also include auxiliary elastically deformable means 21 interposed to press elastically in opposite directions against the shells 16 and 17.

Such deformable means are advantageously of simple structure, e.g. being constituted by a washer or an analogous plate of elastically deformable synthetic material.

Also by way of example in FIG. 4, and for a given bearing 7", the friction members 12" and 13" make up the wall of a chamber 22 housing the coupling means 9". The chamber 22 is axially extended by a cylinder 23 housing the rolling members 15. The wall defining the chamber 22 is made up of the first friction member 12" and of the second friction member 13", which members are movable in sliding relative to each other in angular deflection B. The wall element of the chamber 22 formed by the first friction member 12" is mounted on the carrier structure 8. The wall element of the chamber 22 formed by the second friction member 13" is carried by the cylinder 23.

In auxiliary manner, a friction material 24 is interposed between the first friction member 12" and the second friction member 13".

In a simple embodiment, such a friction material 24 is formed by a surface coating provided on the friction surface of at least one of the friction members 12" and 13".

In a more complex embodiment, such a friction material 24 may comprise a mass of material potentially interposed by sealing between the first friction member 12" and the second friction member 13". Such a mass of friction material 24 may for example be derived from an elastomer material or an analogous synthetic material, and is easily sealed onto the friction members 12" and 13" by vulcanization or by any other analogous sealing technique.

Under the effect of the transmission shaft 5 being set into rotation, the friction material 24 is subjected to shear stresses that generate internal friction in the mass of friction material 24, and such stresses are suitable for damping the angular deflection B of the transmission shaft 5. The use of such a friction portion 24 that operates by internal friction in shear does not lead to excessive complication of the damper means. The chamber 22 is obtained at low cost and after it has become worn it can easily be replaced during a maintenance operation.

What is claimed is:

1. A coupling device for end-to-end coupling between a supercritical transmission shaft and link shafts between which the transmission shaft is interposed, the coupling device comprising:
   coupling means for flexible end-to-end coupling between the ends of the transmission shaft and respectively with one and the other of the link shafts, providing freedom to move in angular deflection (B) about centers of motion (C1) for the transmission shaft relative to the axes of rotation (A) of the link shaft;
   damper means for damping the movement in angular deflection (B) of the transmission shaft relative to the axes of the link shafts; and
   at least one bearing for mounting the transmission shaft at one of its ends on a carrier structure, the bearing comprising a cage that houses at least one rolling member interposed between the transmission shaft and the carrier structure, wherein for a given bearing, the geometrical center (C2) defining the spherical friction surfaces coincides with the center of motion (C1) and generally coincides with the coupling means;
   wherein the damper means comprise at least one pair of friction members having spherical bearing surfaces that are incorporated in the bearing and placed to press one towards the other via respective friction surfaces, a first friction member being securely engaged with the carrier structure and a second friction member being securely engaged with the cage, itself engaged on the transmission shaft to accompany it in its movement in angular deflection (B).

2. A coupling device according to claim 1, wherein the coupling means and the damper means are separate, comprising respective sets of members, the members individually making up the sets being members that are distinct in each of the sets.

3. A coupling device according to claim 1, wherein the cage is secured to move in angular deflection with the transmission shaft via junction means including the rolling member.

4. A coupling device according to claim 1, wherein the friction members are fitted with clamping means pressing one against the other, the clamping means providing an adjustable clamping force.

5. A coupling device according to claim 4, wherein the clamping means comprise elastically deformable means for pressing in opposite directions against the friction members, the elastically deformable means being put under permanent stress by the clamping means at a predetermined stress threshold.

6. A coupling device according to claim 4, wherein the cage is provided with a collar shaped as a portion of a spherical cap, the collar forming the second friction member and being clamped between two shells of the bearing that together form the first friction member, and wherein the clamping means bear axially in opposite directions respectively against the two shells.

7. A coupling device according to claim 1, wherein the cage includes a cylinder for receiving the rolling member, the cylinder being extended axially by a chamber housing the coupling means, the wall defining the chamber being made up of two wall elements providing respectively the first friction member and the second friction member.

8. A coupling device according to claim 1, wherein the cage is provided with a collar shaped as a portion of a spherical cap, the collar forming the second friction member and being clamped between two shells of the bearing that together form the first friction member.

9. A coupling device according to claim 1, wherein the friction surfaces include surface treatment in order to impart their coefficient of friction thereto.

10. A coupling device according to claim 1, wherein a friction material is interposed between the friction surfaces.

11. A coupling device according to claim 1, wherein the coupling means are of the type comprising a flexible member interposed between a link shaft and a corresponding end of the transmission shaft, the flexible member being in radially opposite engagement respectively with the transmission shaft and with the link shaft.

12. A rotorcraft according to claim 1, the rotor being a tail rotor or a propulsive propeller.

13. A coupling device for a supercritical transmission shaft, the coupling device comprising:
- a flexible coupler configured to couple an end of a transmission shaft to an end of a link shaft at an interface plane, the flexible coupler enabling freedom of motion in angular deflection for the end of the drive shaft relative to a central axis of the link shaft;
- a bearing configured to mount a transmission shaft to an aircraft structural member, the bearing including a cage housing a rolling member, the cage being configured to move in angular deflection with the transmission shaft; and
- a damper configured to damp the angular deflection of the drive shaft, the damper including a first friction member and a second friction member, the first friction member being couplable with an aircraft structural member and having a first spherical bearing surface, the second friction member being coupled to the cage and having a corresponding second spherical bearing surface frictionally engaged with the first spherical bearing surface, the first and second spherical bearing surfaces have a common geometric center of curvature coinciding generally with the interface plane.

14. A rotorcraft comprising:
a drive source;
an inlet link shaft drivingly coupled with the drive source;
a rotor;
an outlet link shaft drivingly coupled with the rotor;
a supercritical transmission shaft being in end-to-end engagement at its ends respectively with the inlet link shaft and the outlet link shaft; and
a coupling device for end-to-end coupling between the supercritical transmission shaft and the inlet and outlet link shafts, the coupling device including
coupling means for flexible end-to-end coupling between the ends of the transmission shaft and respectively with the inlet and outlet link shafts, providing freedom to move in angular deflection (B) about centers of motion (C1) for the transmission shaft relative to the axes of rotation (A) of the respective link shaft;
damper means for damping the movement in angular deflection (B) of the transmission shaft relative to the axes of the inlet and outlet link shafts; and
at least one bearing for mounting the transmission shaft at one of its ends on a carrier structure, the bearing comprising a cage that houses at least one rolling member interposed between the transmission shaft and the carrier structure;
wherein the damper means comprise at least one pair of friction members having spherical bearing surfaces that are incorporated in the bearing and placed to press one towards the other via respective friction surfaces, a first friction member being securely engaged with the carrier structure and a second friction member being securely engaged with the cage, itself engaged on the transmission shaft to accompany it in its movement in angular deflection (B).

* * * * *